United States Patent [19]

Scott

[11] 4,448,454
[45] May 15, 1984

[54] ADJUSTABLE AUTOMOBILE SEAT BRACKET

[76] Inventor: Wayne A. Scott, R.R. Saunemin, Saunemin, Ill. 61769

[21] Appl. No.: 341,421

[22] Filed: Jan. 21, 1982

Related U.S. Application Data

[63] Continuation of Ser. No. 55,222, Jul. 5, 1979.

[51] Int. Cl.$^3$ ............................................. A47C 1/02
[52] U.S. Cl. ................................... 297/313; 248/371; 248/393; 297/326; 297/327
[58] Field of Search ............... 297/313, 326, 327, 325; 248/371, 397; 296/65 R; 292/265, 267, 276

[56] References Cited

U.S. PATENT DOCUMENTS

| | | | |
|---|---|---|---|
| 342,724 | 5/1886 | Archer | 248/397 |
| 1,564,844 | 12/1925 | Gardner | 292/267 X |
| 1,747,290 | 2/1930 | Corrigan | 292/276 |
| 1,788,113 | 1/1931 | Leach | 248/397 |
| 2,182,915 | 12/1939 | Connoly | 297/313 X |
| 2,221,268 | 11/1940 | Sears | 297/313 X |
| 2,302,387 | 11/1942 | Greeno et al. | 248/371 |
| 2,355,762 | 8/1944 | Van Derveer | 297/313 |
| 3,120,371 | 2/1964 | Dall | 248/397 |
| 3,296,740 | 1/1967 | Sconzo | 292/265 |
| 3,362,746 | 1/1968 | Huyge | 297/313 |
| 3,580,634 | 5/1971 | Bock | 297/313 |
| 3,975,050 | 8/1976 | McKee | 248/371 X |
| 4,067,533 | 1/1978 | Kazaoka | 248/397 |

FOREIGN PATENT DOCUMENTS 38342 11/1923 Norway ............................... 297/327

*Primary Examiner*—James T. McCall
*Attorney, Agent, or Firm*—Niro, Daleiden & Jager

[57] ABSTRACT

An adjustable seat bracket particularly useful in connection with vehicular seats, and a set assembly including a seat affixed to the adjustable seat bracket are disclosed. The bracket has first and second support means joined by a hinge at their respective rear portions. The bracket is provided with latch means for releasably maintaining the support members in a fixed angular relationship with each other. In a preferred embodiment, the latch means comprises a slotted catch bar projecting from one support member, and a bolt means movably attached to the other support member and adapted to engage the slotted catch bar.

A seat may readily be affixed to the present bracket which is in turn easily attached to a seat support surface. In order to change the angle of inclination of a seat to which the bracket has been installed, the latch means is first disengaged, the seat is moved to the new desired angular orientation, and the latch is released so that it can re-engage, thereby fixing the seat at the new angular orientation.

2 Claims, 9 Drawing Figures

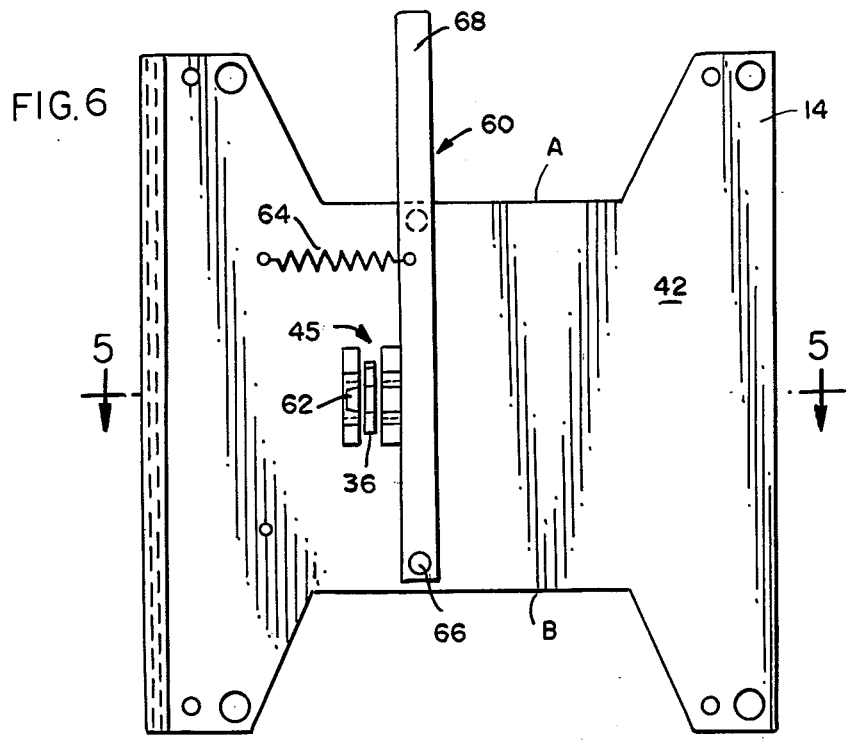
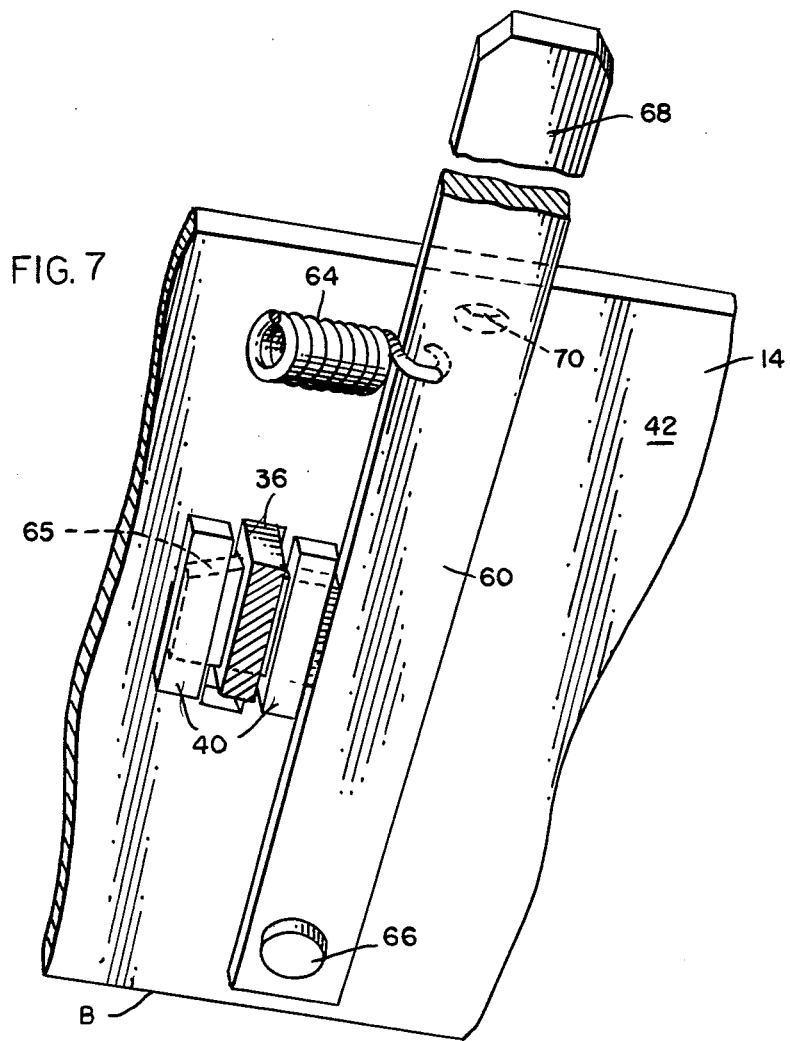

ADJUSTABLE AUTOMOBILE SEAT BRACKET

This is a continuation of application Ser. No. 055,222, filed July 5, 1979.

BACKGROUND OF THE INVENTION

The present invention relates generally to adjustable seats and, more particularly, to seats adjustable in inclination or tilt. The invention is particularly useful in connection with independent vehicle seats such as automobile bucket seats and automobile split-bench seats.

The importance of adjustability in mass-produced seating is well recognized by those designing seating where comfort and freedom from fatigue are important objectives. In particular, it is recognized that the degree of seat inclination best suited to a particular individual will vary depending upon the musculoskeletal structure of that individual. Thus, optimal adjustment of the inclination of seat and back portions from the horizontal and vertical planes respectively will contribute to comfort of the seating and will reduce the fatigue experienced as a result of sitting for extended periods of time.

In the case of vehicles, where one is often confined to a sitting position for considerable periods of time, tilt adjustability of the seat is very desirable. Adjustability in the inclination of the driver's seat under such conditions is particularly important because it helps reduce driver fatigue and thereby improves driving safety.

Although most vehicles are equipped with longitudinally adjustable seats to permit variation in the distance of the seats from the dashboard and foot wells, tilt adjustability is not generally available in in vehicle seats. When tilt adjustable seats are available, they are available only as a vehicle "option" not much sought after by vehicle purchasers.

The dearth of vehicles having these prior complex tilt adjustment mechanisms is not surprising. These mechanisms are expensive to construct and install. They are generally heavy and thus contribute to vehicle weight and the consequent loss of fuel mileage.

If a simple, light and inexpensive tilt mechanism were available, tiltable vehicle seats would no longer be considered luxury items, but would rather be recognized as required vehicle accessories. The adjustable seat bracket disclosed herein represents a simple, lightweight and inexpensive solution to this need for tiltable vehicle seats. It may be used as original equipment or it may be fitted to existing non-tiltable vehicle seats.

SUMMARY OF THE INVENTION

The present invention is directed to an adjustable seat bracket for rendering a seat adjustable in inclination or tilt. The bracket is designed for disposition between a seat support surface and a seat to permit the seat to be angularly adjusted with respect to the seat support surface. The bracket may be incorporated in vehicle seats as original equipment or used in retrofit applications. In vehicular applications, the seat support surface will be either a stationary or a longitudinally adjustable mounting structure affixed to the vehicle floor. The bracket may also be used in nonvehicular applications.

The bracket has first and second support members which are respectively attached to the seat and to the seat support surface with appropriate mounting means. The support members are pivotably joined at their rear portions by a hinge means. The hinge means permits the support members to be angularly displaced from each other. The bracket also includes latch means for releasably maintaining the support members in a desired angular relationship with each other.

In a preferred embodiment, the latch means includes a fixed slotted catch bar projecting from a first one of the support members towards the other or second one of the support members and bolt means movably attached to the second support member for releasably engaging the slotted catch bar. The second support member has a clearance opening permitting the catch bar to pass therethrough as the support members are moved into and out of proximity with each other. The bolt means, which is manipulated by a control lever, may be disposed between the two support members or it may be disposed on the outwardly directed face of either support member.

A seat fitted with the present seat bracket may be adjusted by a person while he is sitting in the seat. In use, the desired angle of inclination may be obtained by releasing the latch and then decreasing or increasing the angle of inclination of the seat by pressing against the seat portion of the back portion of the seat. Once the desired angle of inclination is reached, the latch means is returned to its engaged position thereby fixing the seat at its new angle of inclination.

The present invention includes an adjustable seat bracket and a seat assembly including a seat affixed to the adjustable seat bracket.

It is, therefore, an object of the present invention to provide an adjustable seat bracket for disposition between a seat support surface and a seat to make the seat adjustable in inclination.

It is another object of the present invention to provide an adjustable seat bracket useful in rendering vehicle seats adjustable in inclination or tiltable.

A further object of the present invention is to provide an adjustable seat bracket which may be operated while one is sitting on the seat.

Another object of the invention is to provide an adjustable seat bracket which is compatible with noninclining automobile seats and is operable within the spatial constraints of vehicle seating areas.

Other objects and features of the invention will become apparent upon examination of the following specification and drawings together with the claims. While the invention is described below in connection with preferred or illustrative embodiments, these embodiments are not intended to be exhaustive or limiting of the invention. Rather, the invention is intended to cover any alternatives, modifications, and equivalents that may be included within its spirit and scope as defined by the appended claims.

BRIEF DESCRIPTION OF THE DRAWINGS

The invention, together with further of its objects and attendant advantages, will be best understood by reference to the following description taken in connection with the accompanying drawings in which:

FIG. 6 is a top view of the second or bottom support member of the adjustable seat bracket of FIG. 5;

FIG. 7 is an enlarged view of the control lever of the latch means of the embodiment of FIG. 5;

Similar reference numerals are applied to corresponding features throughout the different figures of the drawings.

DETAILED DESCRIPTION OF THE INVENTION

Figure 1:
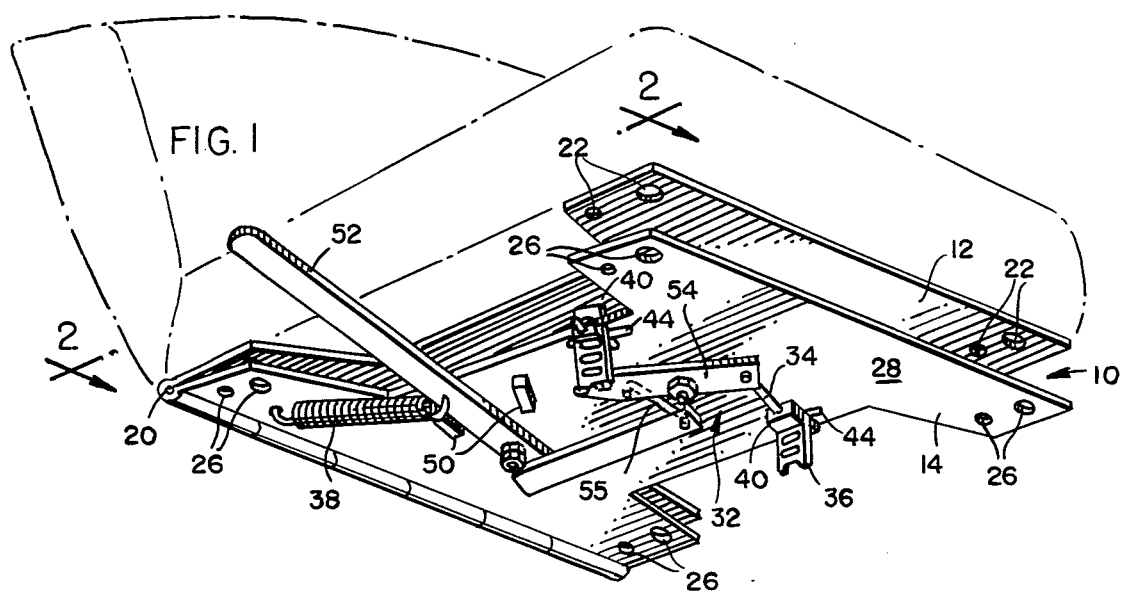
FIG. 1 is a perspective view of one embodiment of the present invention showing a seat affixed to an adjustable seat bracket but with mounting bolts removed.
Figure 2:
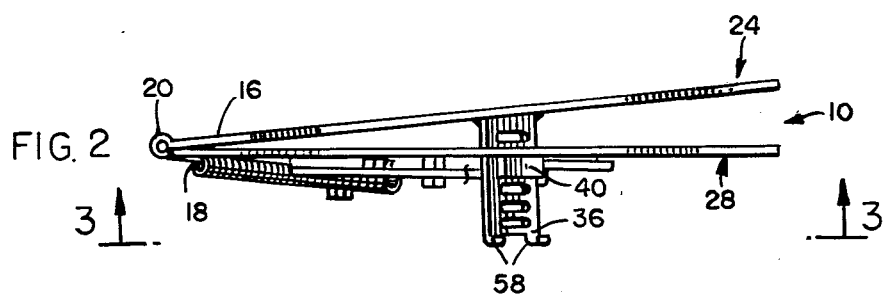
FIG. 2 is a side view of the adjustable seat bracket taken along line 2—2 of FIG. 1.
Figure 3:
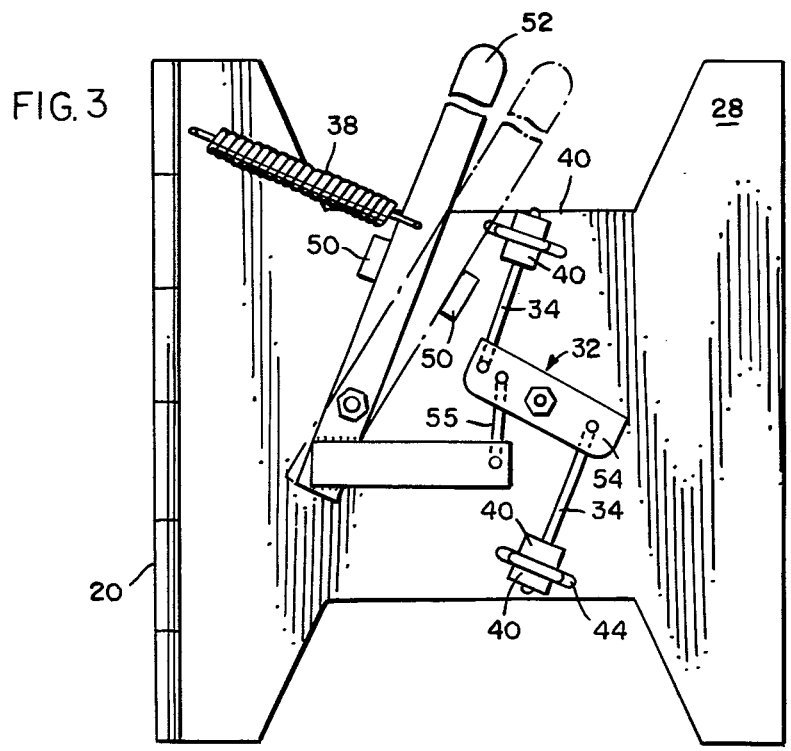
FIG. 3 is a bottom view of the second or bottom support member of the bracket of FIG. 1 taken along line 3—3 of that figure in which the latch mechanism is clearly illustrated.
Figure 4:
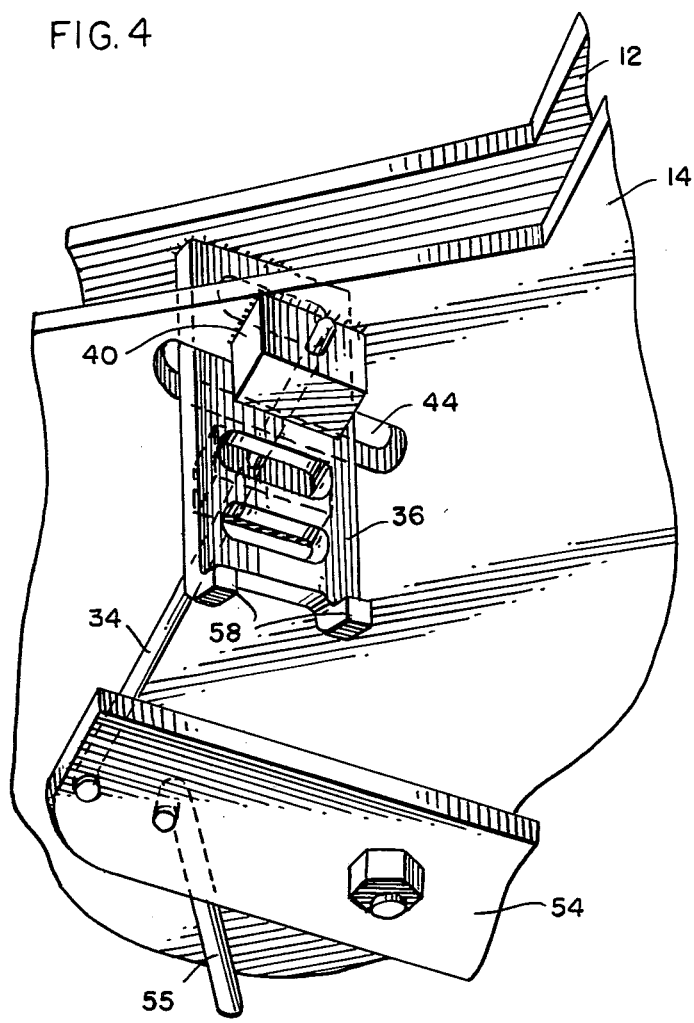
FIG. 4 is an enlarged fragmentary view of the bracket showing the slotted catch bar and bolt means of the latch mechanism utilized in the embodiment of FIG. 1.

Turning now to the drawings, there is illustrated an adjustable seat bracket 10 comprising a first support member 12 and a second support member 14 with corresponding rearward portions 16 and 18. The first and second support members, as illustrated, are formed from rigid plates composed of such materials as steel, aluminum or a thermoplastic resin. The support members may alternatively be made from bar or tubular stock formed into a generally planar structure appropriately configured to serve in place of the illustrated plates.

The first support member 12 has holes 22 for mounting the outwardly directed face 24 of the first support member 12 to the underside 13 of seat 11. Where feasible, the holes 22 are positioned for alignment with existing holes in the seat underside 13 making it possible to readily bolt or otherwise affix the underside of the seat to the first support member 12.

In particular, in the case of a vehicle seat removal of the seat from its seat support will expose mounting holes in alignment with specially configured holes 22 in the first support member 24. Since the numerous vehicles on the market have a limited number of different types of standard seat mounting hardware, a limited number of standard configurations of the holes 22 will suffice to mount numerous different types of vehicle seats. When the adjustable seat bracket 10 is to be employed in conjunction with non-vehicular seating or with vehicular seating with unusual designs, the mounting means employed may entail attachment to parts of the seating other than the seat underside with varying types of conventional mounting hardware.

The second support member 14 has holes 26 for mounting its outwardly directed face 28 to a seat support. As noted above with regard to the first support member 12, when the adjustable seat bracket 10 is used in connection with vehicle seats, the holes 26 will be in one of a limited number of different configurations to accommodate the various types of standard vehicle seat mounting hardware. Various different types of conventional mounting hardware may be used in lieu of the holes 26 for mounting the second support member 14 to different seat support surfaces.

The first and second support members 12 and 14 are pivotably joined at their respective rearward portions 16 and 18 by a hinge 20. The hinge 20 may be formed integrally with the first and second support members 12 and 14, as illustrated in the figures, or the hinge may be a separate unit attached to support members 12 and 14, by conventional means.

The pivotal movement of the first support member 12 and its attached seat, with respect to the second support member 14 which is affixed to the seat support enables the seat to be angularly displaced or tilted with respect to the seat support surface. Tilting of the seat also vertically displaces or raises and lowers the first support member 12 with respect to the seat support surface.

The adjustable seat bracket 10 includes a latch means 32 which may be disposed on the outwardly directed face 28 of the second support member 14 as illustrated in FIGS. 1-4. Alternatively, a latch means 45 may be disposed on the inwardly directed face 42 of the second support member 14, as illustrated in FIGS. 5-7 and 9.

The latch means 32, as depicted in FIGS. 1-4, includes dual bolts in the form of pins 34 which, when at rest, engage slotted catch bars 36 to maintain the support members 12 and 14 in fixed angular relationship. The dual catch configuration depicted in these drawings is particularly well suited to supporting the considerable weight to which the adjustable seat bracket may be subjected.

The slotted catch bars 36 are perpendicularly affixed to the first support member 12. In order to enable the first and second support members 12 and 14 to be moved into and out of proximity with each other, the second support means 12 has elongated clearance openings 44 positioned and sized to permit the catch bars 36 to pass therethrough. The catch bars thus move generally parallel to the arc of movement of the seat as it pivots along hinge 20.

The pins 34 of the latch means 32 are pivotably attached to a force transmitting element 54 for movement in a plane generally perpendicular to the plane of the arc of movement of the seat. Also attached to the element 54 through a linkage 55 is a control lever 52 which is biased to a latch position by a spring 38 affixed to the lever 52 at one end and to the second support member 14 at the other end. Various types of compression and tension springs may be employed in this application and affixed as required.

The force transmitting element 54 and the control lever 52 are pivotally mounted to the second support member 14. The spring tension experienced by the control lever 52 is transmitted to the pins 34 through the action of the force transmitting element 54 thereby maintaining the pin 34 in engagement with the slotted catch bar 36.

The latch means 43 includes stops 50 to confine the movement of the control lever 52. The latch means 32 also includes pair of supports 40 positioned on either side of the clearance opening 44. The supports 40 direct the movement of the pin 34 as it is moved into and out of engagement with the catch bar 36 and support the pin 34, when engaged, against the forces to which it is subjected.

The length of the catch bar 36 will be dictated, in some instances, by the clearance available below the seat support surface. In a vehicle, for example, the seat support surface will generally be a longitudinally adjustable track mechanism with about 4–8 inches of clearance to the vehicle floor. The length of the catch bar in this case would have to be less than the distance from the outwardly directed face 28 of the second support member 14 to the floor of the vehicle plus the thickness of the second support member 14. In some applications, however, it will be possible to invert the bracket 10 from the orientation discussed above to thereby permit the catch bar 36 to move in clearance space below the seat.

When there are no clearance constraints, the length of the catch bar 36 will be dictated by the desired limit of angular displacement between the first and second support surfaces 12 and 14. In the case of a vehicle, for example, safety considerations would probably require that the angle of displacement between the support members 12 and 14 should not exceed 25°. Thus, the catch bar 36 would not have slots beyond that catch would permit the adjustable seat bracket 10 to be fixed at the 25° point. As a safety precaution, it is further desired to have a safety stop means in the form of, for example, a lip 58 or other protruding device in the catch bar 36 which would engage the second support surface at the desired limiting angle of separation to prevent separation beyond that point.

Turning to FIGS. 5–7, and 9 there are depicted adjustable seat brackets 10 generally embodying the disclosure of FIGS. 1–4. In the case of the embodiment of FIGS. 1–4, however, a latch means 45 is disposed on the inwardly directed face 42 of the second support member 14 and is thus positioned between the first and second support members 12 and 14.

Figure 5:
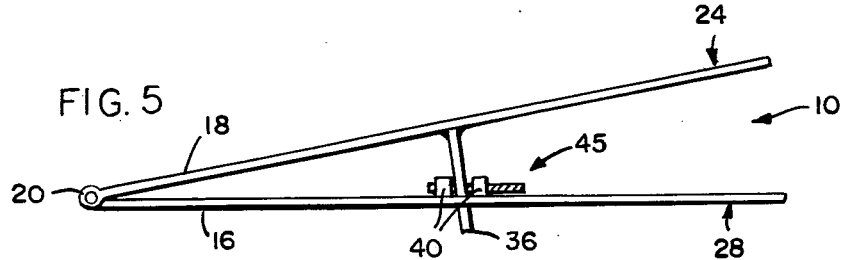
FIG. 5 is a side view of an alternative adjustable seat bracket incorporating the principles of the present invention wherein an alternative latch mechanism is disposed between the first and second support members.

The latch means 45 comprises an alternate control lever 60 which includes as an integral part thereof a latching bolt in the form of nose 62. The lever 60 is pivotably attached to the second support member 14 at pivot point 66 by a bolt or other pivotable fastening means. The control lever 60 may be in the form of a bar as depicted in FIGS. 5–7, or it may be of a circular, or other cross-sectional shape.

Nose 62 which may be either coplanar with alternate control lever 60 or offset therefrom, engages a single slotted catch bar 36 in a like manner to the engagement between the pins 34 and the catch bars 36 of the embodiment of FIGS. 1–5. Nose 62 of lever 60 is held in spring-loaded releasable engagement with the desired slot of the catch bar 36 by the action of a spring 64 which is attached to the lever 60 at one end and to the second support member at the other end. Nose 62 has a clearance bevel 65 which permits it to pass through supports 40 as it is swung into and out of engagement with slotted catch bar 36.

Control lever 60, which is best seen in FIGS. 6 and 7, may be attached in alternate positions on the second support member in order to station the protruding portion 68 of the lever 60 at complimentary positions along the edge of the bracket 10. Thus, for example, the lever 60 as depicted in FIG. 7 may be reoriented about its longitudinal axis to thereby reposition the protruding portion of the arm from its original position at edge A of second support member 14 to a complimentary position at edge B. In its new position, pivot point 66 of lever 60 would be fixed at hole 70 of second support member 14.

Figure 9:
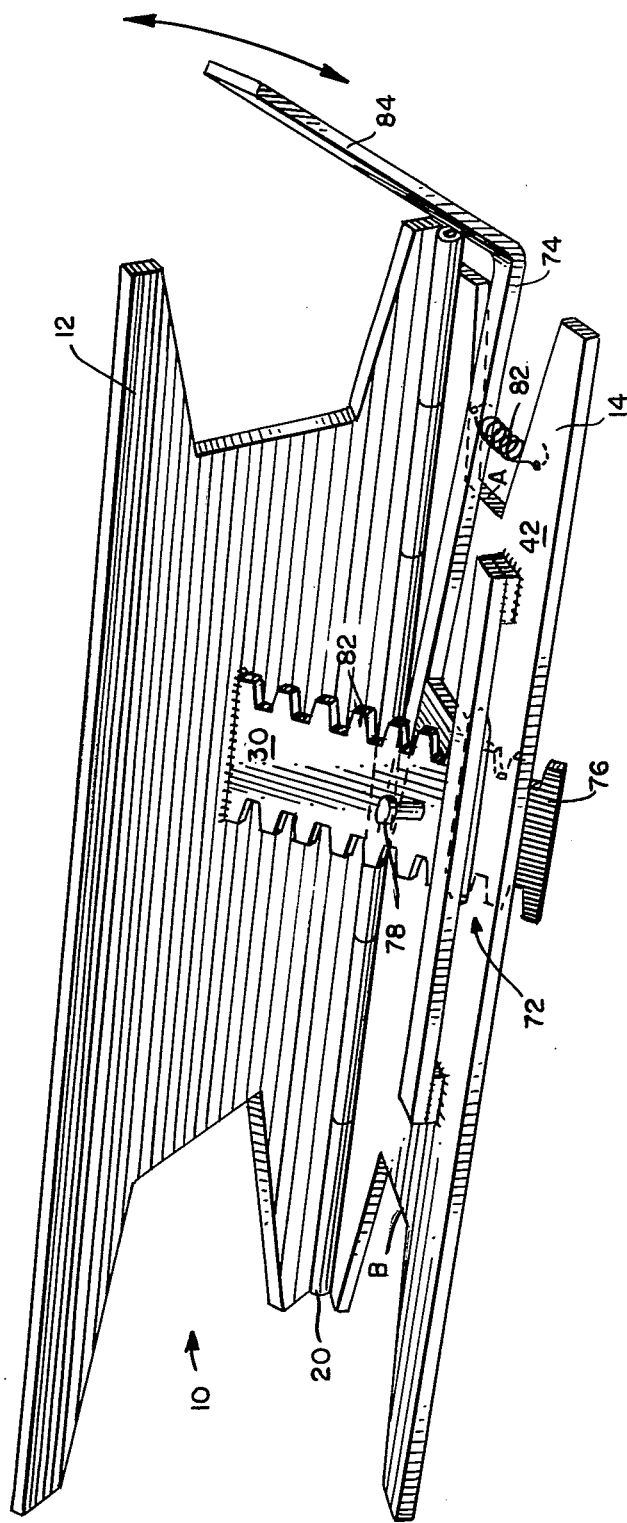
FIG. 9 is a side view of an alternative adjustable seat bracket incorporating the principles of the present invention wherein an alternative latch mechanism is utilized.

In the embodiment of FIG. 9, a latch means 72 is disposed on the inwardly directed face 42 of the second support member 14 and is thus positioned between the first and second support members 12 and 14. The latch means 72 comprises an offset control lever 74 which includes as an integral part thereof a latching bolt in the form of nose 76. The lever 74 is pivotably attached to the second support member 14 at pivot point 78 by a bolt or other pivotable fastening means.

Nose 76 engages an edge-slotted catch bar 80. The catch bar 80 has beveled slots 82 which help guide the nose 76 into engagement. The bar 80 has slots along each of its longitudinal edges to accommodate alternate positioning of the arm 74, as discussed further below. Nose 76 of lever 74 is held in spring-loaded releasable engagement with the desired slot of the catch bar 80 by the action of a spring 82 which is attached to the lever 74 at one end and to the second support member at the other end.

Control lever 74 may be attached in alternate positions on the second support member in order to station the offset portion 84 of the lever 60 at complementary positions along the edge of the bracket 10. Thus, for example, the lever 74 may be reoriented to reposition the protruding portion 84 from its original position at edge A of second support member 14 to a complementary position at edge B. In its new position, the nose 76 would engage the complementary longitudinal edge of the catch bar 80, but the protruding portion would be bent through the horizontal plane and into a complementary orientation. In an alternate arrangement, the protruding portion 84 may be a separate part removably affixed to the control arm to facilitate re-orientation.

Figure 8:
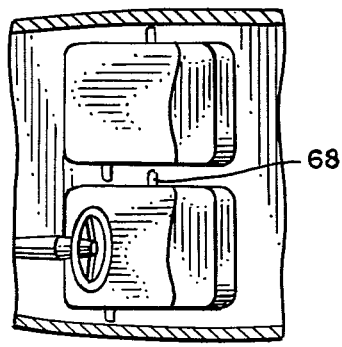
FIG. 8 is a cut-away fragmentary plan view of an automobile in which adjustable seat brackets incorporating the principles of the present invention are disposed between automobile bucket seats and their respective longitudinally adjustable seat supports with the protruding control levers of the brackets situated in non-interfering positions.

The flexability in latch means attachment discussed above is especially useful in vehicular seating applications where obstructions at the base of the seat such as consoles and longitudinal seat adjustment controls abound. Thus, a single adjustable seat bracket 10 may be adapted for use in different automobiles having different spatial constraints. Also, as depicted in FIG. 8, two identical brackets 10 may be adapted for installation in passenger and driver seats respectively by orienting control levers 60 or 74 at complementary positions on the support member 14.

I claim:

1. An adjustable seat bracket for disposition between a seat support surface and a seat mounted within a vehicle, comprising:

top and bottom generally flat support plates pivotally hinged at their rearward edges, said top support plate adapted to be affixed to said seat with said rearward edge of said top support plate in proximity to the rearward edge of the seat and said bottom support plate being adapted to be affixed to said seat support surface within the vehicle;

latch means mounted to and between said top and bottom generally flat support plates for releasably maintaining said support plates and said seat and seat support surface in a desired angular relationship, said latch means being spaced rearwardly of the forward edge of the seat;

said latch means including a slotted catch bar depending from the underside of said top support plate toward said bottom support plate, said bottom plate having a clearance opening positioned and sized to permit said catch bar to pass therethrough as said support plates are moved toward and away from each other, bolt means movably attached to said bottom support plate on the underside thereof for releasably engaging said slotted catch bar, and stop means on said catch bar and engageable with said bottom support plate to limit the extent of pivotal movement of said seat;

a control lever movably fixed to the underside of said bottom support plate and linked to said bolt means for moving said bolt means into and out of engagement with said slotted catch bar, said control lever including a portion protruding beyond one side edge of said bottom plate to permit ready access to the control lever; and spring means connected between said control lever and said bottom support plate for biasing said bolt means into engagement with said slotted catch bar.

2. The adjustable seat bracket of claim 1 including means for affixing said control lever to said bottom support plate in alternate positions to permit said protruding portion to be oriented so as to protrude beyond either side edge of said bottom plate.

* * * * *